Figure 1:
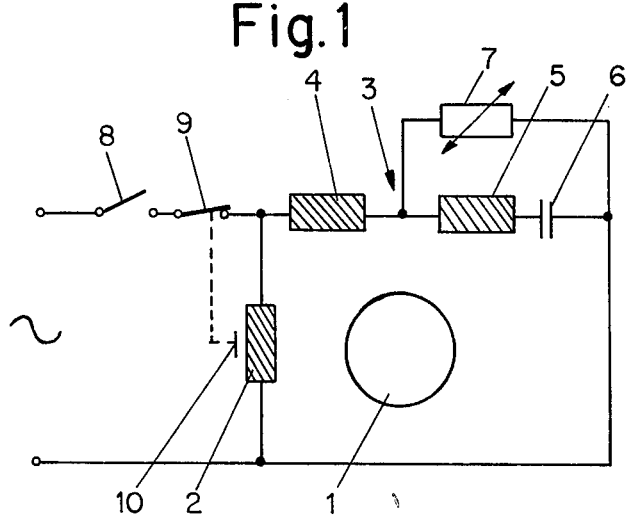

United States Patent [19]

Sørensen

[11] 4,119,894
[45] Oct. 10, 1978

[54] SINGLE PHASE ASYNCHRONOUS MOTOR

[75] Inventor: Per Germann Sørensen, Sonderborg, Denmark

[73] Assignee: Danfoss A/S, Nordborg, Denmark

[21] Appl. No.: 808,654

[22] Filed: Jun. 21, 1977

[30] Foreign Application Priority Data

Jun. 22, 1976 [DE] Fed. Rep. of Germany ....... 2627835

[51] Int. Cl.² .............................................. H02P 1/44
[52] U.S. Cl. ........................... 318/221 D; 318/221 E; 318/221 H; 318/229
[58] Field of Search .......... 318/220 R, 221 R, 221 D, 318/221 E, 221 H, 229

[56] References Cited

U.S. PATENT DOCUMENTS 3,303,402  2/1967  Martin .............................. 318/221 R

FOREIGN PATENT DOCUMENTS 774,187  9/1934  France ................................. 318/221 D Primary Examiner—Gene Z. Rubinson
Attorney, Agent, or Firm—Wayne B. Easton

[57] ABSTRACT

The invention relates to a single phase asynchronous motor having a main winding branch and an auxiliary winding branch for starting. The auxiliary branch has a first section having a first winding and a second section having a second winding and a capacitor in series. The second branch has a PTC resistor in shunt with the second winding and capacitor combination. This arrangement with the PTC resistor facilitates a design which involves selecting the number of turns and the resistance values of the auxiliary windings so that an optimum starting torque can be achieved at the cold temperature of the PTC resistor and a high breakdown torque can be achieved at the hot temperature of the PTC resistor.

1 Claim, 2 Drawing Figures

SINGLE PHASE ASYNCHRONOUS MOTOR

The invention relates to a single-phase asynohronous motor of which the auxiliary winding branch comprises a first auxiliary winding section, a second auxiliary winding section and an operating condenser in series, the second auxiliary winding section and the operating condenser being bridged by a starter device.

In a known asynchronous motor of this kind, the starter device consists of a starter switch which opens after the motor has run up to speed. During running up, the operation is in the manner of an asynchronous motor with an auxiliary resistance phase. This leads to a strong starting torque. After running up, the auxiliary winding that now has a larger number of effective turns works with the operating condenser; this leads to a higher breakdown torque or to a lower power consumption during operation; the wire cross-section of the main winding can also be selected to be smaller.

In the known case, a throughgoing auxiliary winding is provided with a tapping for connection the starter switch. Both auxiliary winding sections therefore have the same wire cross-section. The first winding section must have a high ohmic resistance designed for the resistance starting. This leads to a very thin wire which easily burns out. A thicker wire would need to be a bifilary winding. The high resistance is also effective during operation. The second winding section must therefore not have a resistance that is all too high. This limits the freedom of design. Protective devices for the auxiliary winding branch are not provided in this connection.

In a modified embodiment, an obmic resistance is provided in the starting branch and the starter switch is in the form of a reversing switch which, during the starting stage, applies the obmic resistance to the mains supply and, during operation, applies the auxiliary winding branch with the operating condenser to the mains supply. In this construction there is a greater freedom in designing the ohmic resistance of the first auxiliary winding branch. However, the sudden switching on of the operating condenser after running up leads to undesirable current peaks. Protection for the auxiliary winding branch is not provided.

In electric motors with an auxiliary resistance phase it is known to provide a PTC resistor as the starter device, of which the cold resistance forms a considerable portion of the ohmic resistance of the auxiliary phase and which is so designed that, as a result of heating by the current that flows through, it reaches its hot resistance shortly after running up, so that the auxiliary winding is practically switched off. In this case, the auxiliary winding can have such a low resistance that, at maximum starting current, it does not heat up as rapidly as does the main winding on short circuit current.

The invention is based on the object of providing a single phase asynchronous motor of the aforementioned kind which, with optimum design for starting and operation, has a well protected auxiliary winding branch as well as a power consumption and copper requirement which are as low as possible.

This problem is solved according to the invention in that the starter device is formed by a PTC resistor of which the cold resistance is of the same order of size as the resistance of the first auxiliary winding section and which is designed so that is reaches its hot resistance shortly after running up, that the cross-section of the singly wound wire of the first auxiliary winding section is designed so that it withstands a load caused by the maximum starting current in the auxiliary winding branch until the PTC resistor reaches its hot resitance, and that the cross-section of the singly wound wire of the second auxiliary winding section is smaller than the wire cross-section of the first auxiliary winding section.

With this arrangement, the first auxiliary winding section can advantageously be designed for resistance starting as far as its number of turns is concerned. Since a considerable proportion of the starting resistance is formed by the cold resistance of the PTC resistor, the wire of the first auxiliary winding section need not be bifilary. Also, it can have an adequately large cross-section so that it will not heat up too rapidly even when the motor is blocked. In contrast, the second auxiliary winding section is designed with a thin wire. This results in a saving of copper in the coil in addition to that in the main winding. The number of turns and the ohmic resistance of the second section can be designed so that when added to those of the first winding section they result in optimum operating conditions, i.e. an optimum breakdown torque. The ohmic resistance of the second auxiliary winding section may be larger than that of the first without thereby causing excessive heat losses because the obmic resistance is correspondingly low in the first winding section. Since the second winding section and the operating condenser are directly in parallel with the PTC resistor, it is even desired that the second winding section should have a somewhat higher resistance so that only a negligibly small current will flow through the second auxiliary winding section during starting. In particular, the sum of the ohmic resistance of these winding sections can be equal to the ohmic resistance of an auxiliary winding that is designed for an optimum breakdown torque. In this respect it is assumed that a motor with a main winding, auxiliary winding and condenser was designed for an optimum breakdown torque. This results in the design of the auxiliary winding according to the invention that consists of the two winding sections. The first section in conjunction with the PTC resistor can be designed for the desired starting torque as far as wire cross-section and number of turns are concerned. Thereafter, the wire cross-section of the second winding section can be designed so that the previously calculated data are available for operation. This means that not only the sum of the number of turns but also the sum of the resistances of the two winding sections will correspond to the desired operating value. The auxiliary winding is also adequately protected against possible burning out when the rotor is blocked. This is because the first winding section will withstand the maximum starting current at least until the PTC resistor has reached its hot resistance as a result of self-heating. The second auxiliary winding section is loaded to a considerably less extent because of the higher resistance and the series connection with the operating condenser, whereby it will readily withstand the current flowing through it until a normal protection switch, which may for example respond to the temperature of the main winding, cuts off the mains.

The precise dimensioning of the cold resistance of the PTC resistor depends on the particular conditions. It is favourable if there is a resistance proportioning of 1:1 between the cold resistance and the winding resistance. However, a larger range of between about 2:1 and 1:2 comes into consideration.

It has proved desirable if the wire cross-section of the second auxiliary winding section is about half that of the first auxiliary winding section. Depending on the ratio of the number of turns, the ohmic resistance of the second winding section will then generally be about 30 to 100% higher than that of the first winding section.

With particular advantage, the total number of turns of the auxiliary winding is about 1.5 times that of the main winding and the first auxiliary winding section has more turns than the second auxiliary winding section. In particular, the number of turns of the first auxiliary winding section can be 80 to 90% and the number of turns of the second auxiliary winding section 60 to 70% of that of the main winding.

Figure 2:
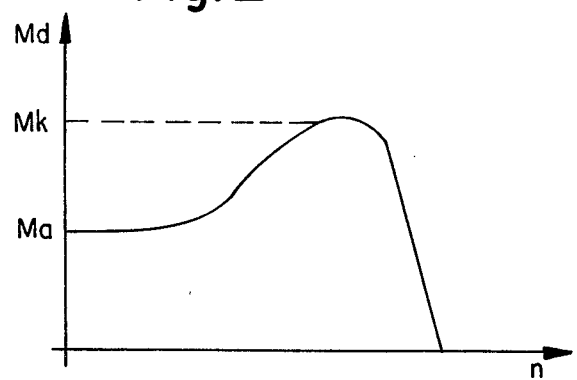

An example of the invention is illustrated in the drawing, wherein:

FIG. 1 is a circuit diagram of the single-phase asynchronous motor according to the invention, and FIG. 2 is a torque diagram.

FIG. 1 shows an electric motor 1 having a main winding 2 as well as an auxiliary winding branch 3 which consists of the series circuit of a first auxiliary winding section 4, a second auxiliary winding section 5 and an operating condenser 6. A PTC resistor 7 bridges the second auxiliary winding section 5 and the operating condenser 6. The whole is energised by A.C. mains by way of a main switch 8. The supply line can also contain a protecting switch 9 which is controlled by a temperature sensor 10 in the region of the main winding 2 and responds to excessive temperature.

In one embodiment, the main winding 2 had a total of 400 turns. The auxiliary winding section 4 had 350 turns and the auxiliary winding section 5 250 turns, i.e. a total of 600 turns. With an appropriately designed operating condenser, this leads to optimum operation with a low loss. The first winding section 4 consists of a wire having a diameter of 0.5 mm and the second auxiliary winding section 5 consists of a wire with a diameter of 0.35 mm, which corresponded to about half the cross-section of the wire of the first section. The ohmic resistance of the first auxiliary winding section 4 amounted to about 8.5 ohm whilst that of the second auxiliary winding section 5 amounted to about 21.6 ohm. The cold resistance of the PTC resistor amounted to about 10 ohm in a range below 80° C. and its hot resistance roughly 1000 ohm at a temperature around 100° C.

This results in the following manner of operation. When switching the main switch 8 on, the entire auxiliary winding current flows through the first section 4 and the predominant portion through the PTC resistor 7 because the other branch has a correspondingly high impedence because of the operating condenser 6 and the higher resistance of the section 5. This results practically in pure resistance starting with a high starting torque $M_a$. In the meantime the PTC resistor 7 heats up. When it assumes its hot resistance after running up, practically the entire but now very small current flows through the two winding sections 4 and 5 as well as the operating condenser 6. This manner of operation leads to a relatively high breakdown torque $M_k$. This is high in relation to a pure resistance motor so that for example in a refrigeration compressor a lower input power per kilocalorie of cooling effect will be sufficient or one can achieve more intense refrigeration with a given size of motor and compressor. Whereas in a resistance motor the breakdown torque is determined solely by the main winding, both the main winding and the auxiliary winding contribute to the breakdown torque in the case of a condenser motor. This permits the winding cross-section to be kept smaller. Summarising, when using a condenser motor instead of a resistance motor with an auxiliary phase that can be switched off one can save on copper at the same nominal power. The starting torque is generally 50 to 60% of the breakdown torque.

Since the PTC resistor performs no switching, current and voltage surges are also avoided during switching over. In addition, the first winding section 4 is protected by the PTC resistor 7 when the motor blocks. The second winding section 5 is not endangered in any case because of the low current. It readily withstands a load up to the time when the main winding 2 of the protectng switch 9 responds as a result of excessive temperature.

I claim:

1. A single phase asynchronous motor comprising a main winding branch having a main winding, an auxiliary winding branch having first and second winding sections, and first section having a first winding, said second section having a second winding and a capacitor in series, a PTC resistor in said second section shunting said second winding and said capacitor, a suitable starting torque being obtained by said first section having a predetermined ohmic resistance and said PTC having a cold starting resistance of the same order of magnitude as said ohmic resistance, and a suitable breakdown torque being obtained by said second winding having a substantially smaller cross sectional area than said first winding to provide a substantially higher resistance during operation when said PTC resistor exhibits a substantially higher resistance in its heated state.

* * * * *